United States Patent
Wang et al.

(10) Patent No.: US 9,644,947 B2
(45) Date of Patent: May 9, 2017

(54) OPTICAL INTERFEROMETRIC APPARATUS FOR REAL-TIME FULL-FIELD THICKNESS INSPECTION AND METHOD THEREOF

(71) Applicant: National Tsing Hua University, Hsinchu (TW)

(72) Inventors: Wei-Chung Wang, Hsinchu (TW); Chi-Hung Huang, Taichung (TW); Po-Chi Sung, Hsinchu (TW); Meng-Hsiu Li, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 14/461,548

(22) Filed: Aug. 18, 2014

(65) Prior Publication Data
US 2015/0204655 A1 Jul. 23, 2015

(30) Foreign Application Priority Data

Jan. 20, 2014 (TW) ............................. 103101988 A

(51) Int. Cl.
*G01B 9/02* (2006.01)
*G01B 11/06* (2006.01)
(52) U.S. Cl.
CPC ................. *G01B 11/0675* (2013.01)
(58) Field of Classification Search
CPC .... G01B 11/02; G01B 11/06; G01B 9/02022; G01B 9/02038

USPC .................................................. 356/503, 512
See application file for complete search history.

(56) References Cited

U.S. PATENT DOCUMENTS

| | | | | |
|---|---|---|---|---|
| 5,654,798 A | * | 8/1997 | Bruning | G01B 11/2441 356/512 |
| 6,501,552 B1 | * | 12/2002 | Mizuno | G01B 9/02059 356/512 |
| 2004/0027579 A1 | * | 2/2004 | Lee | G01B 11/06 356/504 |

* cited by examiner

*Primary Examiner* — Jonathan Hansen
(74) *Attorney, Agent, or Firm* — Jackson IPG PLLC; Demian K. Jackson

(57) ABSTRACT

A device for real-time thickness inspection is provided. An optical interferometric technique is used. Measurement requirements in rapid online thickness inspection can be satisfied. An object is measured in a non-contact and non-destructive way. For measuring, an optical spherical wavefront is radiated on the object in an oblique angle. The interference fringe pattern (IFP) thus imaged on a screen is directly related to the thickness distribution of the object. The phase difference on the same horizontal cross section in the IFP monotonically decreases from the light source side to the other side. Accordingly, phase unwrapping can be effectively performed without using phase shift. The present invention achieves rapid on-line thickness inspection through the optical path of interference without using optical lens groups and special optical elements. The present invention radiates a high-coherence point-expanded spherical-wavefront light beam in an oblique angle for an instantaneous and wide-area full-field thickness measurement.

7 Claims, 10 Drawing Sheets

OPTICAL INTERFEROMETRIC APPARATUS FOR REAL-TIME FULL-FIELD THICKNESS INSPECTION AND METHOD THEREOF

TECHNICAL FIELD OF THE INVENTION

The present invention relates to thickness inspection; more particularly, relates to using an optical interferometric technique without using optical lens groups and the special optical elements in the optical path of interference, where a high-coherence point-expanded spherical-wavefront light beam is propagating to an object in an oblique angle for an instantaneous and wide-area full-field thickness measurement; phase shift is not necessary; the optical setup is simple; and cost is low for real-time online inspection.

DESCRIPTION OF THE RELATED ART

Thin film transistor-liquid crystal display (TFT-LCD) is the mainstream product of flat panel display in the past decade. Taiwan and South Korea focus on the development of its technology and related researches very much. Until today, TFT-LCD still occupies a certain market. But, with the technologies of light-emitting diode (LED) and related displays revealed, TFT-LCD enters into an age of transformation, where its development turns from the technology of mass production in the past to the technology of precision, high-quality and high yield now. Nevertheless, during the development of the pursuit of large size, light weight and thinness, problems not previously encountered appear, where the most influential one is Mura phenomenon—brightness non-uniformity on a display.

Causes of the Mura phenomenon are quite complex. When the manufacturer cannot find key factors for the phenomenon, some non-defective products can only be obtained through mass production for achieving pre-determined quantity. However, such practice not only cause unnecessary resource consumption, but also cannot effectively control the yield of the product. In such a highly competitive monitor industry, this issue does need a solution. Yet, most studies for Mura only analyze the non-uniformity of image on display, which can be categorized as quality management, and cannot effectively diagnose the Mura phenomenon. A more feasible way is to improve the producing procedure and strengthen the structure of device. Therefore, inspections for mechanical or optical properties of the important components of TFT-LCD are necessary. By analyzing their physical properties, the crux of the problem is found. Or, through the inspection results, defected products can be filtered out on the production line for further improving the product yield.

Among components used for making TFT-LCD, glass substrate is important, which is used as a substrate of color filter or thin film transistor. The above two components are quite related to the quality of display. Therefore, the glass substrate needs to be defect-free, homogeneous and surface-flatness, etc. In addition, in the process of assembling the display, some areas may be susceptible to higher contact stress than the other area owing to non-uniformed thickness distribution of the glass substrate. On the other hand, with the development of light-weighted monitor, the glass substrate has a thickness down to hundreds of microns and the manufacturing control on precision becomes quite challenging. In micro-scale, the thickness distribution of the glass may have a considerable change following its own weight. If the thickness distribution of the glass has significant variation, the change will be more severe. As a result, when the monitor is placed at a different angle, the monitor may have a different image quality due to the weight of the glass substrate itself.

Regarding thickness measurement for transparent materials, Costantino et al (S. Costantino and O E Martinez, "Wide Band Interferometry for Thickness Measurement," Optic Express, vol. 11, no. 8, pp. 952-957, 2003) revealed a prior art that the image capture device of a white light interferometer was replaced by a spectrometer to measure film thickness and group refractive index. Li et al (M. Li, C. Quan, C J Tay, R. Ivan, and S. Wang, "Measurement of Transparent Coating Thickness by the Use of White Light Interferometry," Proceedings of SPIE, vol. 5852, pp. 401-406, 2005) revealed a prior art that a white light Mirau interferometer and a fast Fourier transform (FFT) were used to measure thickness of a coated film on a mirror surface while the problem of phase ambiguity in phase shift was overcome. Protopopov et al (V V Protopopov, S. Cho, K. Kim, and S. Lee, "Heterodyne Double-Channel Polarimeter for Mapping Birefringence and Thickness of Flat Glass Panels," Review of Scientific Instruments, vol. 77, no. 5, pp. 053107/1-6, 2006) revealed a prior art that a relationship between thickness and measurement transmittance was used to calculate difference in thickness of a glass plate. For example, a plate glass having a thickness of 0.7 mm might have a difference up to 5 μm in the overall thickness distribution. Gao et al (L. Gao, C H Wang, Y C Li, H F Cong, and Y. Qu, "Investigation of Cross-Polarized Heterodyne Technique for Measuring Refractive Index and Thickness of Glass Panel," Optics Communications, vol. 283, pp. 3310-3314, 2010) revealed a prior art that a Zeeman laser was used to be equipped with a heterodyne interferometer for measuring the birefringence of a flat glass and its variation in thickness. Cheng and Liu (H C Cheng and Y C Liu, "Simultaneous Measurement of Group Refractive Index and Thickness of Optical Samples Using Optical Coherence Tomography," Applied Optics, vol. 49, no. 5, pp. 790-797, 2010) revealed a prior art that optical coherence tomography (Optical Coherence Tomography, OCT) was used with 3×3 fiber optic connector to measure thickness and group refractive index of glass, where the thickness error was about 1.4% and the group refractive index was about 1.9%. The above measuring methods require the refractive index in advance. Fathi and Donati (M T Fathi and S. Donati, "Thickness Measurement of Transparent Plates by a Self-Mixing Interferometer," Optics Letters, vol. 35, no. 11, pp. 1844-1846, 2010) revealed a prior art that a self-mixing Interferometer (SMI) was used to measure thickness of glass without knowing the refractive index, where the error could be reduced to 1.6%. However, the above measuring methods are single-point measurements and require the assistance of a translation stage or a stepping motor to perform the scanning to the transparent object for obtaining two-dimensional (2D) information. In this regard, Ri and Muramatsu (S. Ri and T. Muramatsu, "A Simple Technique for Measuring Thickness Distribution of Transparent Plates from a Single Image by Using the Sampling Moiré Method," Measurement Science And Technology, vol. 21, pp. 025305_1-8, 2010) revealed a prior art that a sampling Moiré method was developed for measurement to instantaneously obtain a 2D thickness information, where the measurement error was about 1.9%. But, due to the interference method and the optical restrictions on grating pitch (Pitch), the sampling Moiré method cannot measure minor thickness difference.

From the above prior arts, it is known that, on measuring thickness of a thin object or micro-scale thickness variation of an object, the laser interferometer theory is quite suitable for this thickness range; but does not simultaneously meet the requirements of rapid on-line inspection, including short measurement time and large measurement area.

For precise length measurement, laser interferometer is often used because of its high sensitivity and measurement accuracy are determined with wavelength which always reaches tens to hundreds of nanometers. Common laser interferometers include Michelson interferometer, Twyman Green interferometer, Fizeau interferometer and Mach-Zender interferometer, etc. In the common laser interferometers, amplitude division optical components such as beam splitters are needed to divide the light beam into the object light beam and the reference light beam. After reflected back by the object and the mirror respectively, the object and reference light beams are merged together by the amplitude division optical components to generate the interference fringe pattern (IFP). The distribution of interference fringes in the IFP is mainly determined by the distribution of phase difference (optical path difference) between the object light beam and the reference light beam. Besides, the optical lens groups are required to transfer the high-coherence point-expanded spherical-wavefront light beam into the parallel-wavefront collimated light beam. Because the IFP produced when the object light beam is reflected from the object in the normal direction of the object are captured to be analyzed and the parallel-wavefront collimated light beam is employed, the distribution of interference fringes in the captured IFP have no fixed regularity. Therefore, the optical path length of the reference light beam needs to be changed by a precision translation stage such as PZT stage for measurement to accomplish the phase-shift technique. However, the implementation of the phase shift is time consuming so that the rapid on-line inspection cannot be achieved. Besides, the optical components such as amplitude division optical components, optical lens groups, mirrors, and etc. are used in the optical path of interference for generating the IFP, the measurement area will be definitely restricted by the sizes of these optical components.

The plates made of the optically transparent material are indispensable elements in today's technology products. With the development trend of large size and light weight, the thickness uniformity of the optically transparent plate used in the product will be closely related to the quality of the product. However, most of the laser interferometer techniques for thickness measurement are single-point measurements only, and the phase shift technique is always required for thickness analysis. Consequently, it is necessary to capture multiple images; time consumed during implementing the phase shift which may cause the rapid on-line inspection cannot be achieved; and, the measurement area is restricted by the sizes of the optical components. Hence, the prior arts do not fulfill all users' requests on realistic use.

SUMMARY OF THE INVENTION

The main purpose of the present invention is to provide an optical interferometric apparatus without using optical lens groups and the special optical elements such as beam splitter and PZT stage in the optical path of interference and to cast a high-coherence point-expanded spherical-wavefront light beam to an object in an oblique angle for an instantaneous and wide-area full-field thickness measurement in a real-time online inspection.

Another purpose of the present invention is to provide an immediate and full-field thickness measurement method, where only one interference fringe pattern (IFP) image of an object is needed to determine full-field thickness map of the object.

Another purpose of the present invention is to provide a thickness measurement method by analyzing interference fringes in the IFP, where the interference fringes is directly related to thickness of an object; there is no need to perform the phase shift in measurement and the optical setup is simple; no any optical component which limits the measurement area is used in the optical path for interference; the specification of the employed image acquisition equipment can be basic and an instantaneous full-field wide-area thickness measurement can be achieved.

To achieve the above purposes, the present invention is an optical interferometric apparatus for real-time thickness inspection, comprising a light source, a screen, an image acquisition unit and an image processing module, where the light source radiates a high-coherence point-expanded spherical-wavefront light beam; the screen is set in front of the light source, an IFP is imaged on the screen by illuminating the high-coherence point-expanded spherical-wavefront light beam on an object in an oblique angle; the image acquisition unit is set in front of the screen; the image acquisition unit captures the image of the IFP on the screen to convert this image into a digital image of the IFP; and the image processing module is connected with the image acquisition unit to analyze the digital image of the IFP for obtaining a full-field thickness distribution of the object by a given thickness-IFP relation through numerical calculation. Accordingly, a novel optical interferometric apparatus for real-time thickness inspection is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the view showing the preferred embodiment according to the present invention;

DESCRIPTION OF THE PREFERRED EMBODIMENT

The following description of the preferred embodiment is provided to understand the features and the structures of the present invention.

Figure 1:
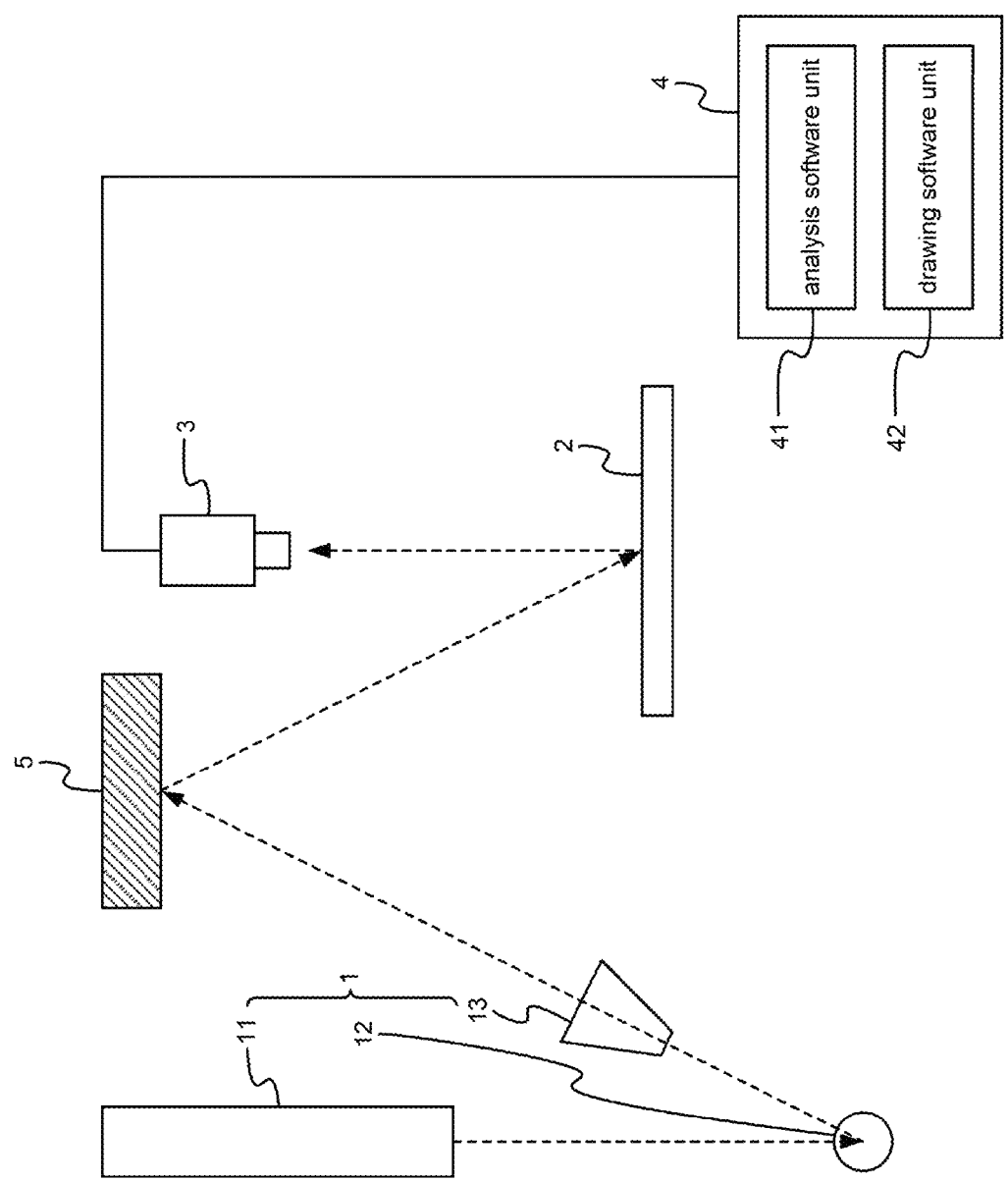
Figure 2:
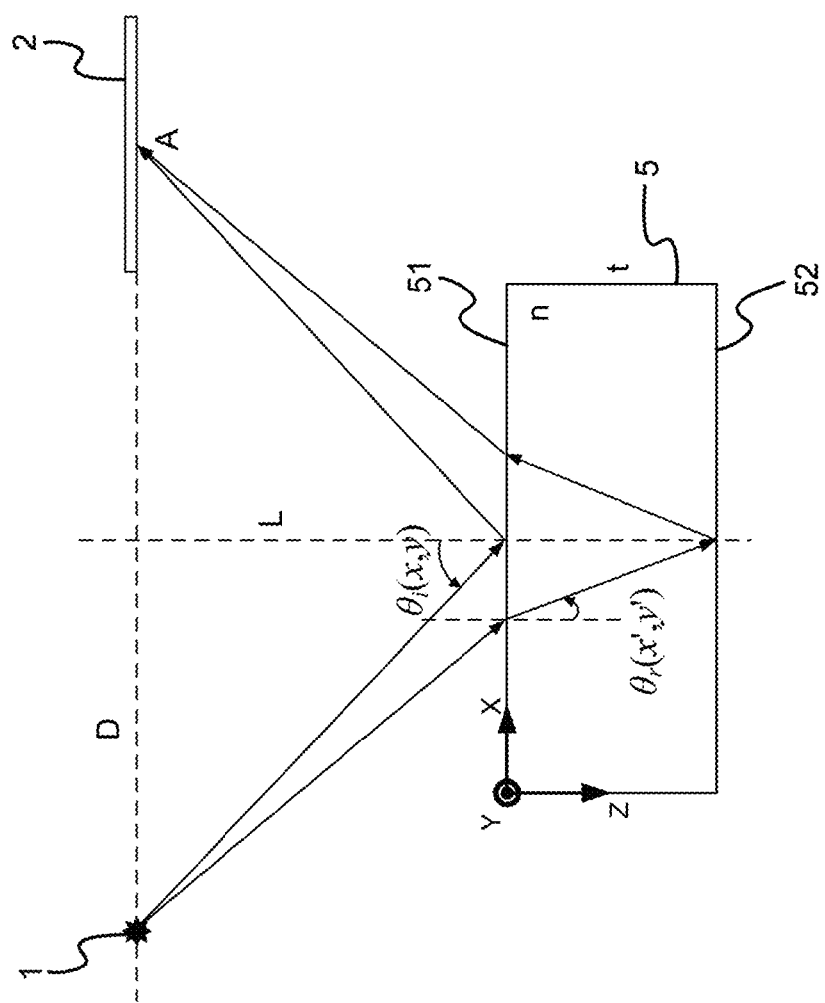
FIG. 2 is the view showing the arrangement of the optical path of interference.
Figure 3:
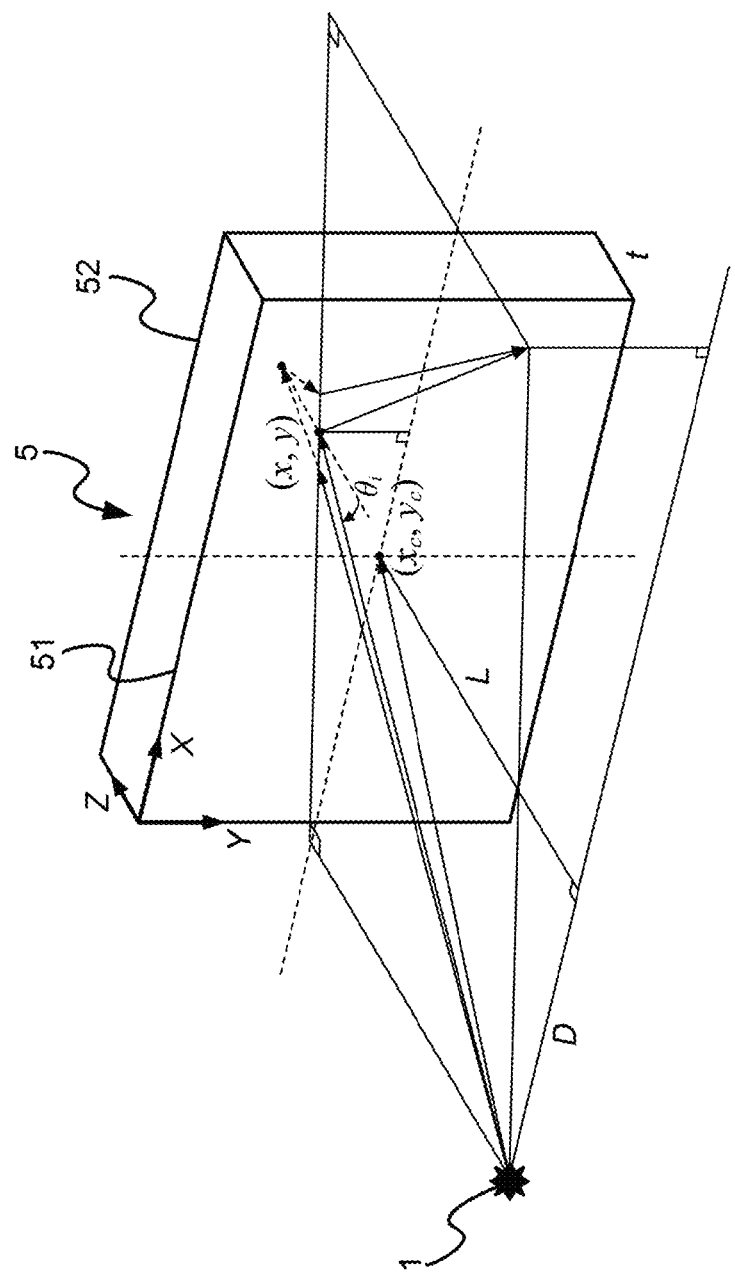
FIG. 3 is the view showing the three-dimensional (3D) relationship between the high-coherence point-expanded spherical-wavefront light beam and the object.

Please refer to FIG. 1 to FIG. 3, which are a view showing a preferred embodiment according to the present invention; a view showing an arrangement of an optical path of interference; and a view showing three-dimensional (3D) relationship between a high-coherence point-expanded spherical-wavefront light beam and an object. As shown in the figures, the present invention is an optical interferometric apparatus for real-time thickness inspection, comprising a light source 1, a screen 2, an image acquisition unit 3 and an image processing module 4.

The light source 1 comprises a laser source 11, a beam steering device 12 and a spatial-filter point-expanded device 13. The laser source 11 generates a laser beam. The beam steering device 12 is set between the laser source 11 and the spatial-filter point-expanded device 13, which composes three mirrors and each mirror has degrees of freedom in two rotating directions for guiding the laser beam to a desired position and a desired direction. The spatial-filter point-expanded device 13 is set in front of the beam steering device 12, which comprises an object lens coordinated with pinhole for filtering spatial noise in a light field and for expanding the laser beam to form a spherical wavefront—a high-coherence point-expanded spherical-wavefront light beam.

The screen 2 is set at the lateral side of the light source 1 to image an interference fringe pattern (IFP) generated by illuminating the high-coherence point-expanded spherical-wavefront light beam on the object 5 in an oblique angle. Therein, the object 5 is set between the light source 1 and the screen 2 and in front of the spatial-filter point-expanded device 13 to obtain the oblique angle at an optical axis direction of spatial-filter point-expanded device 13. Thus, the object 5 is illuminated by the high-coherence point-expanded spherical-wavefront light beam in the oblique angle.

The image acquisition unit 3 is set in front of the screen 2 to capture the IFP on the screen 2 and to convert the captured IFP into a digital image.

The image processing module 4 is connected with the image capture unit 3, comprising an analysis software unit 41 for measuring thickness, accessing digital image and analyzing image; and a drawing software unit 42 for analyzing image data obtained after being processed by the analysis software unit 41 and for visualizing the analyzed image data. The image processing module 4 uses the analysis software unit 41 to analyze the digital image of IFP and process numerical calculation to the image data to obtain the thickness information contained in the IFP. At last, the drawing software unit 42 shows a drawing of thickness distribution of the object 5. Thus, all units integrate into a novel optical interferometric apparatus for real-time thickness inspection.

The present invention may further comprise a clamping device for fixing the position of the object 5 to make the object 5 illuminated by the high-coherence point-expanded spherical-wavefront light beam in the oblique angle.

The present invention uses a high-coherence point-expanded spherical-wavefront light beam to illuminate an object to generate the IFP for obtaining thickness distribution through a novel measurement theory to analyze the relationship between thickness distribution and IFP. The novel theory is called angular incidence interferometry (AII). An oblique angle is used for measurement. Only a single IFP image is needed to be captured for thickness analysis. The setup for optical path is simple. The area for measurement is not limited by the dimensions of optical components because no any optical component is employed in the optical path of interference. High-specification imaging devices are not required, while the measurement accuracy and precision can be enhanced as the specification of the imaging devices are enhanced. Thereby, the wide-area full-field thickness measurement can be achieved instantly. When the present invention uses a high-coherence point-expanded spherical-wavefront light beam to illuminate a transparent object (including object which are transpicuous at giving non-visible wavelengths) in the oblique angle, the reflecting lights on the front and rear surfaces of the object will interfere with each other, and finally produce the IFP on screen. Because the phase difference variation between the reflecting lights on the front and rear surfaces of the object is monotonic and with the regularity, the interference fringes in the IFP present the regular arrangement. Through a specific analytical method for a given thickness-IFP relation used in the present invention, a full-field thickness distribution of the object can be deduced from one IFP image. This instant and full-field measurement method uses direct relationship between thickness distribution of the object and the IFP, where phase shift is not necessary, setup is simple and the full-field thickness distribution is obtained through analyzing the IFP directly. The present invention is suitable for rapid inspection at a production line to measure thicknesses of products.

In a state of use, a Helium (He)-Neon (Ne) laser is used as the laser source 11, whose mode is TEM00 with a power of 35 milliwatts (mW) and a wavelength of 632.8 nanometers (nm). FIG. 1 shows an advancing path of the center light ray of the laser beam emitted from laser source 11 by the dotted lines; but, in fact, the laser beam becomes a wide-area spherical wavefront after passing through the spatial-filter point-expanded device 13. On using the present invention, the laser beam is guided by the beam steering device 12 to horizontally illuminate into the spatial-filter point-expanded device 13. The laser beam propagates through the beam steering device 12 thus forms a high-coherence point-expanded spherical-wavefront light beam. In FIG. 2, when the high-coherence point-expanded spherical-wavefront light beam passes through the object 5, a part of the light ray is reflected at the front surface 51 of the object 5; another part of the light ray penetrates the front surface 51 of the object 5 and be refracted according to Snell's law and then be reflected at the rear surface 52 of the object 5 on reaching; and these two reflected light rays cross at a position and thus interfere with each other then intersect by the screen 2. Since there is a phase difference between each pair of the interference light rays, the IFP with light and dark interference fringes will be observed on the screen 2. Then, the image acquisition unit 3 (such as: a digital camera) is used to capture an image of the IFP to be sent to the image processing module 4 (such as a computer) for analyzing the image by the analysis software unit 41 and processing numerical calculation. At last, the drawing unit 42 draws a full-field thickness distribution of the object 5.

The IFP observed in the present invention includes thickness information. The analysis software unit 41 is used to extract a distribution of phase difference from the digital image of the IFP. The angle of incident light ray at each position is calculated through geometrical relationship in space for figuring out the corresponding thickness at each position. For a material is transparent at a wavelength of $\lambda$, the relationship related to the thickness at a position (x,y) on a front surface 51 of the object 5; the angle of incident light ray at the position when the object 5 is illuminated by the high-coherence point-expanded spherical-wavefront light beam in the oblique angle; the refractive index of the object 5; and the phase difference of interference at the position is as follows:

$$t(x, y) = \frac{1}{2n\cos\left[\sin^{-1}\left(\frac{1}{n}\sin\theta_i(x, y)\right)\right]} \frac{\lambda}{2\pi} \varphi(x, y).$$

Therein, t(x,y) is the thickness; n is the refractive index; $\theta_i(x,y)$ is the angle of incident light ray; $\lambda$ is the wavelength; and $\phi(x,y)$ is the phase difference.

In FIG. 3, a diagram of spatial relationship between the light source 1 and the object 5 is shown. For expressing the angle of incident light ray as a function of position on the front surface 51 of the object 5, it is assumed that a horizontal distance and a vertical distance between the spatial-filter point-expanded device 13 and a contour reference point $(x_c,y_c)$ on the front surface 51 of the object 5 are D and L, respectively. Thus, the radiating oblique angle of the high-coherence point-expanded spherical-wavefront light beam to the object 5 is as follows:

$$\theta_{iO} = \tan^{-1}\frac{D}{L}.$$

Consequently, the angle of incident light ray at the position of the object 5 illuminated by the high-coherence point-expanded spherical-wavefront light beam in the oblique angle generated through the spatial-filter point-expanded device can be expressed as following relationship:

$$\theta_i(x, y) = \tan^{-1}\left[\frac{\sqrt{(x - x_c - D)^2 + (y - y_c)^2}}{L}\right]$$

Therefore, when the phase difference distribution of the IFP is correctly evaluated and each actual position of the object 5 corresponding to each pixel of the digital image is known, the thickness distribution of the object 5 can be figured out through above two relationships.

Figure 4:
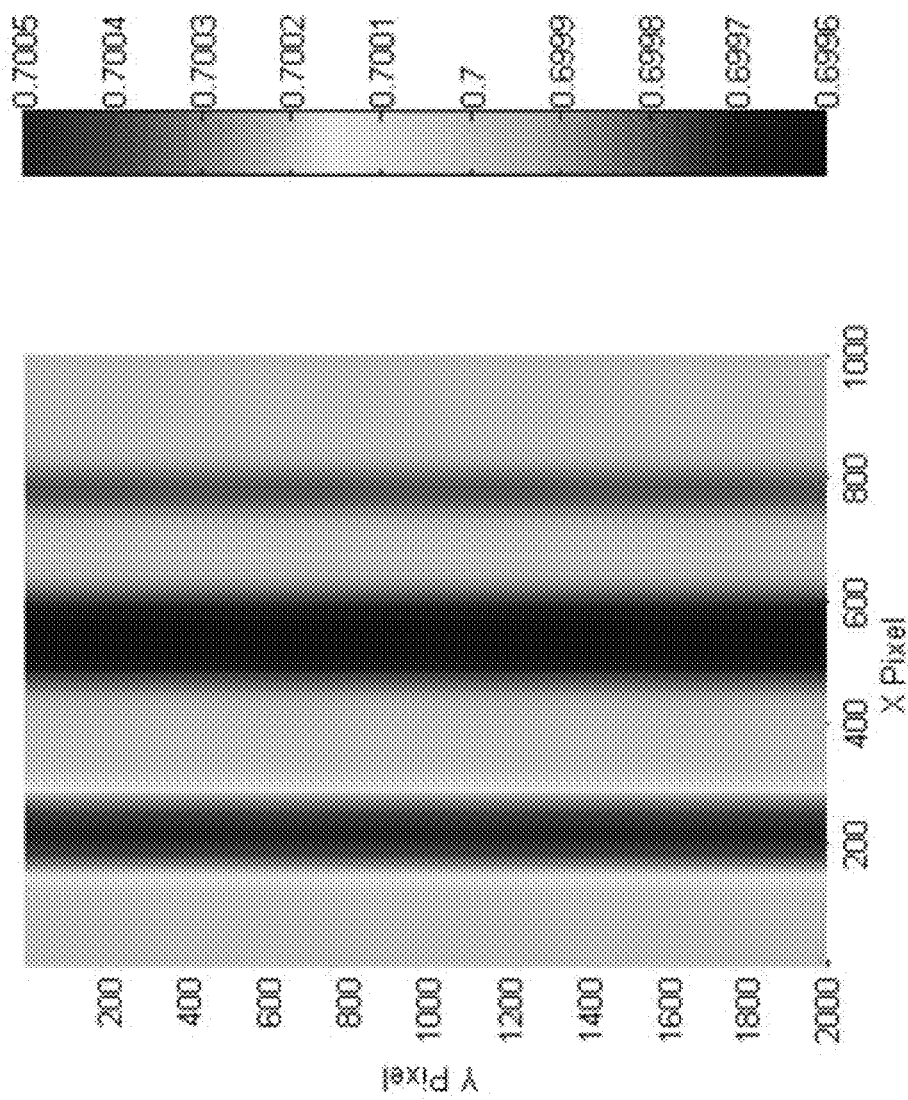
FIG. 4 is the view showing the simulated non-uniform thickness distribution of the transparent object.
Figure 5:
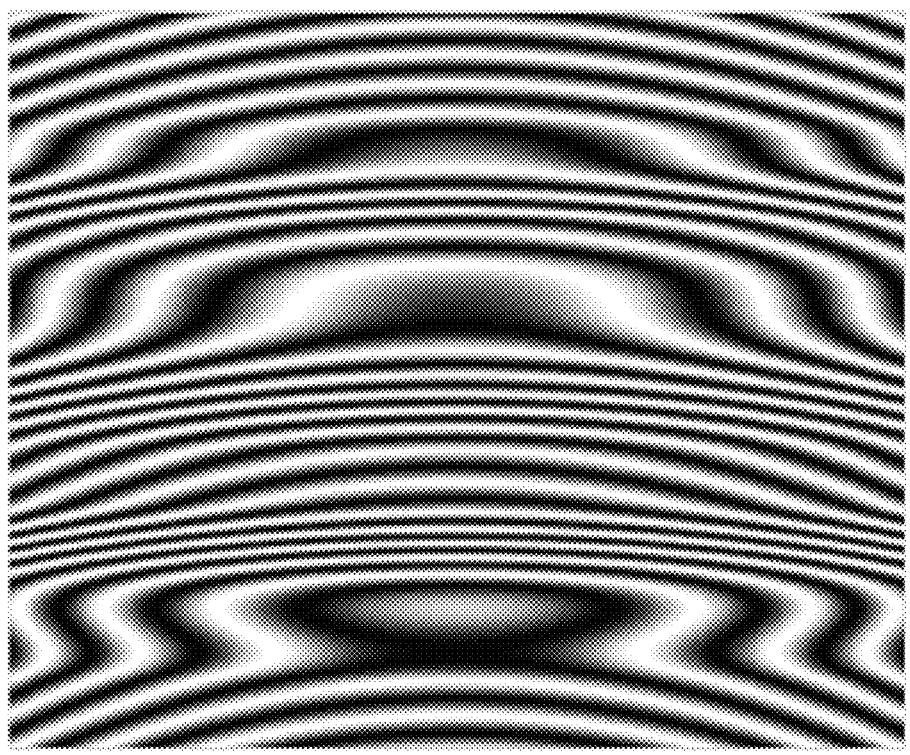
FIG. 5 is the view showing the simulated IFP obtained when the high-coherence point-expanded spherical-wavefront light beam illuminates on the transparent object in an oblique angle of 15°.
Figure 6:
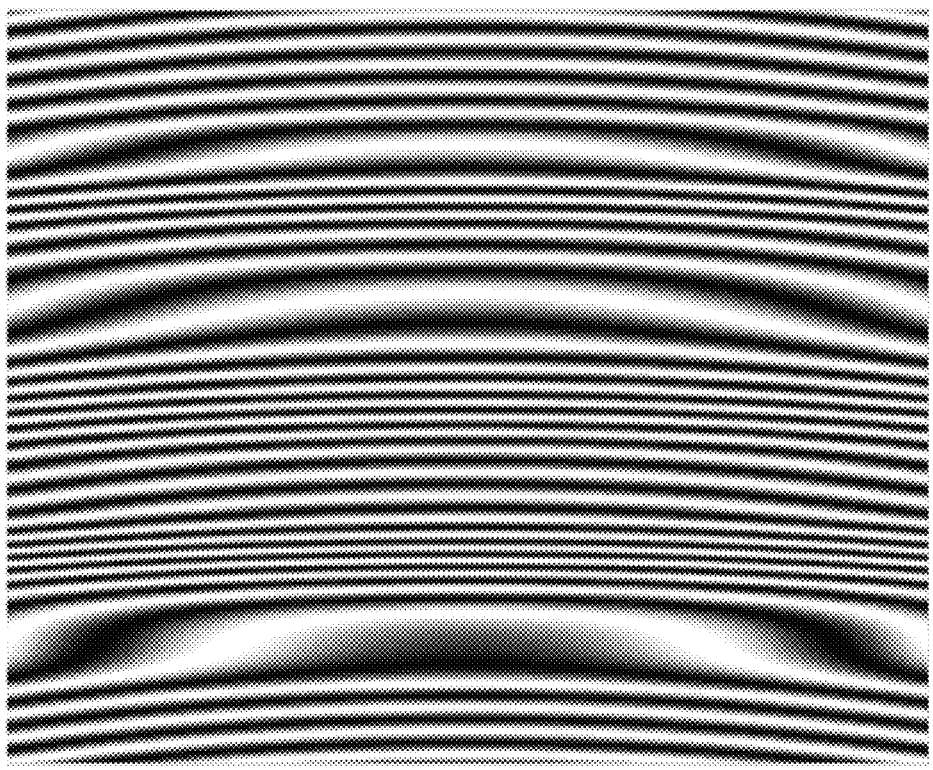
FIG. 6 is the view showing the simulated IFP obtained when the high-coherence point-expanded spherical-wavefront light beam illuminates on the transparent object in an oblique angle of 40°.

Please refer to FIG. 4 to FIG. 6, which are a view showing simulated non-uniform thickness distribution of a transparent object; and views showing simulated IFPs obtained when the point-expanded spherical-wavefront laser light beam illuminates on the transparent object in oblique angles of 15° and 40°. As shown in the figures, the IFP obtained in the present invention is different when the high-coherence point-expanded spherical-wavefront light beam illuminates on non-uniformed transparent object in the different oblique angle. The thickness distribution diagram of the object is shown in FIG. 4; and images of the IFPs obtained when the high-coherence point-expanded spherical-wavefront light beam illuminates on the transparent object in oblique angles of 15° and 40° are shown in FIG. 5 and FIG. 6, respectively. In general interferometry, if the object is with the non-uniform thickness distribution, the interference fringes may present the irregular arrangement and overlap another. It means the phase difference variation is complicated so that the phase-shifting technique has to be adopted to determine the phase difference. However, in the present invention, the interference fringes will display the regular arrangement when the point-expanded spherical-wavefront light beam radiates the object in an appropriate oblique angle. In FIG. 6, the arrangement of interference fringes in the IFP shows good regularity that interference fringes arrange one by one along the horizontal direction and no any fringe laps over another. Furthermore, in FIG. 6, the light intensity distribution on the horizontal cross section can be well described as a cosine function. It illustrates that on each horizontal cross section the phase difference variation is monotonic and the phase difference decreases from light source side to the other side (i.e. from left side to right side) when the oblique angle is 40°. In FIG. 5, the arrangement of the interference fringes in the IFP is more complex. In other words, the phase difference does not monotonically decrease from light source side to the other side on each horizontal cross section of the IFP when the oblique angle is 15°. Hence, in the present invention, the high-coherence point-expanded spherical-wavefront light beam illuminates the object in an appropriate oblique angle for thickness analysis to ensure the arrangement of interference fringes in the IFP presents good regularity, where the oblique angle is located within a preferred range between 16° and 18° and this range has a change in value within ±20%.

Figure 7:
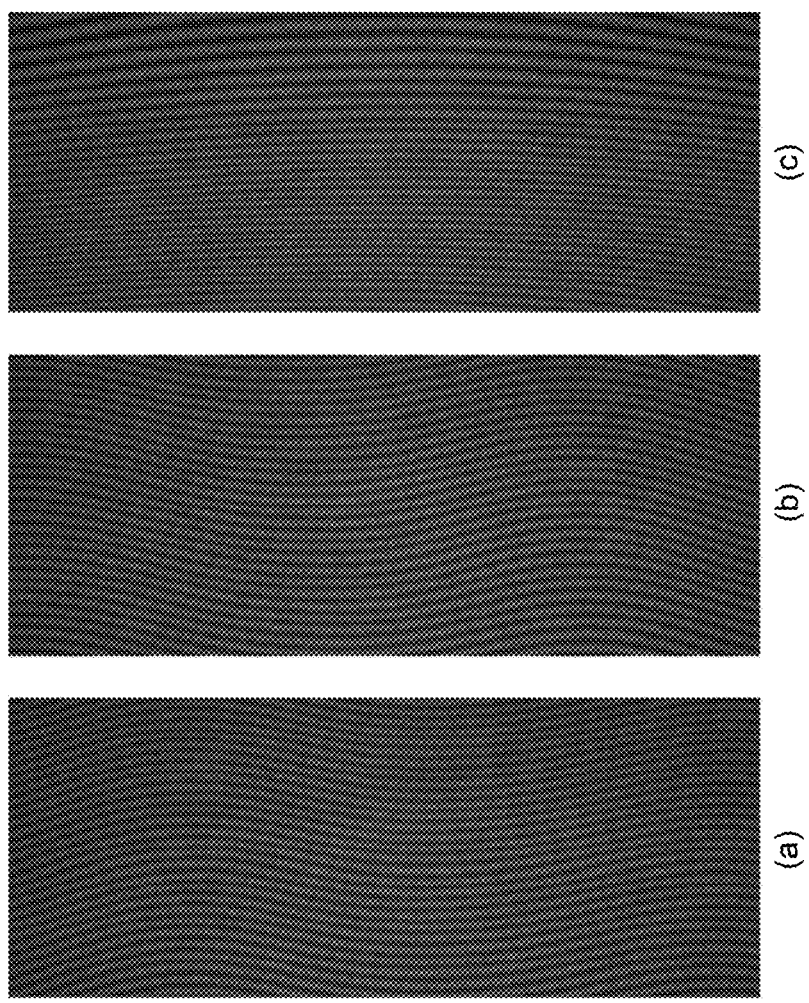
FIG. 7 is the view showing the IFPs of the glass substrates.
Figure 8:
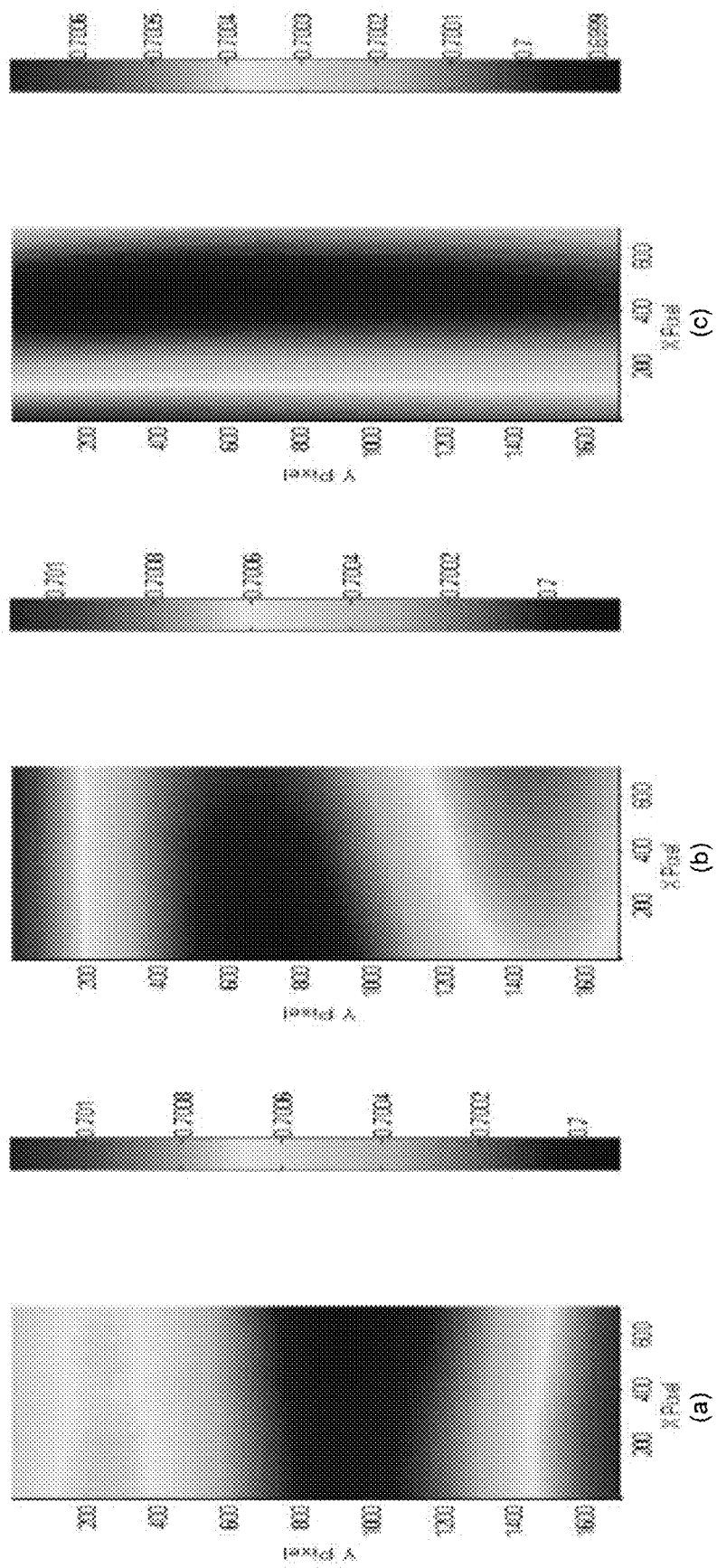
FIG. 8 is the view showing the full-field thickness distributions of the glass substrates.

Please refer to FIG. 7 and FIG. 8, which are a view showing IFPs of glass substrates and a view showing full-field thickness distributions of the glass substrates. As shown in FIG. 7, three IFP images (a), (b) and (c) for glass sheets G1, G2 and G3, show good regularity in the arrangement of interference fringes on each horizontal cross section in all of the three images of IFPs even if the glass sheets all have non-uniform thickness distributions and the thickness distributions between the glass sheets are different too. Then three IFP images (a), (b) and (c) for glass sheets G1, G2 and G3 are analyzed by the analysis software unit 41, thickness distribution of each glass sheet can be determined from each IFP image; where the measurement results are shown, respectively, as images (a), (b) and (c) in FIG. 8.

In the image (a) in FIG. 8, the longitudinal thickness change of the glass sheet G1 is greater than the lateral one, where the full-field thickness distribution is non-uniform along the vertical direction and a difference between the maximum thickness and the minimum one—hereinafter referred to as a maximum non-uniformity of the full-field thickness distribution—is 1.2 micrometers ($\mu$m). In the image (b) in FIG. 8, the glass sheet G2 has a similar result as the glass sheet G1, which also shows vertical non-uniformity in the full-field thickness distribution and with the same 1.2 $\mu$m maximum non-uniformity in full-field thickness; but, there is a relatively large thickness of a block area near bottom of the object. In the image (c) in FIG. 8, the thickness distribution of the glass sheet G3 is obviously different from those of the glass sheets G1 and G2, where thickness variation occurs mainly in the horizontal direction and the maximum thickness non-uniformity of full-field thickness distribution is 0.8 $\mu$m.

Figure 9:
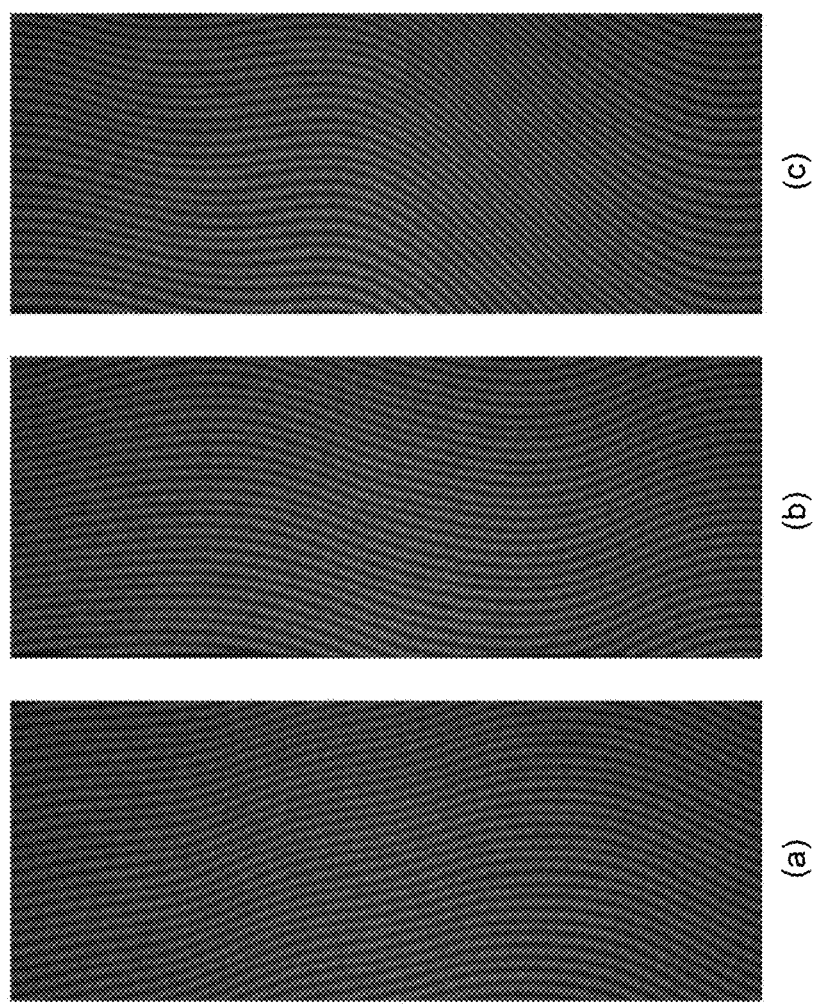
FIG. 9 is the view showing the IFPs of the film-coated glass substrates.
Figure 10:
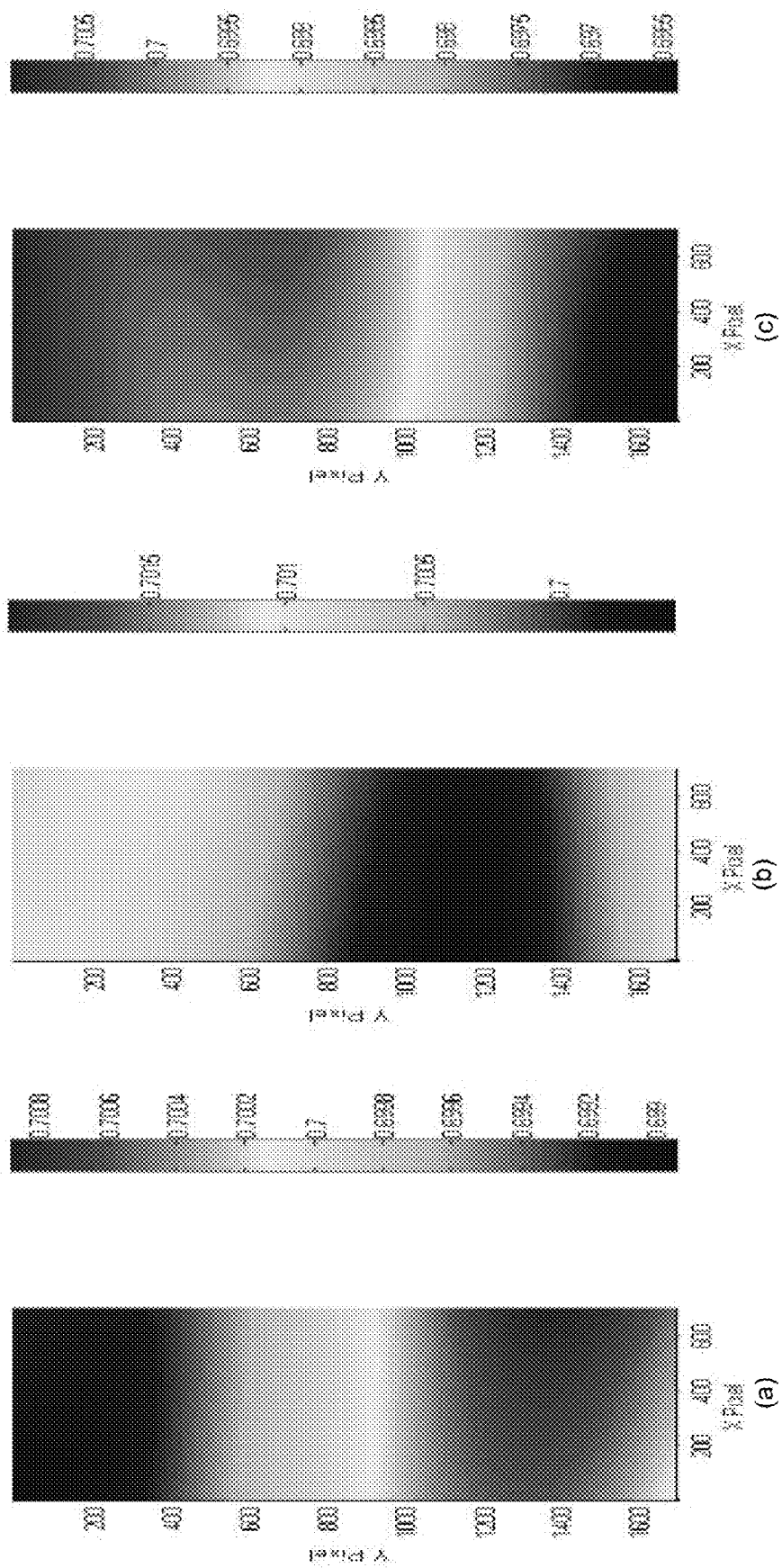
FIG. 10 is the view showing the full-field thickness distributions of the film-coated glass substrates.

Please refer to FIG. 9 and FIG. 10, which are a view showing IFPs of film-coated glass substrates; and a view showing full-field thickness distributions of the film-coated glass substrates. As shown in the figures, images (a), (b) and (c) in FIG. 9 sequentially shows interference fringes of film-coated glass substrates CG1, CG2 and CG3, where non-uniform thickness distributions appear. The thickness distributions obtained through analyzing the IFP images are shown in images (a), (b) and (c) in FIG. 10, where the full-field thickness distributions are non-uniform along the vertical direction. Therein, there is a relatively thick bulk region near bottom of the substrate CG1; and, the thick bulk region of the substrate CG3 has the biggest area ratio occupying upper region of the substrate. The maximum thickness non-uniformities of the three substrates are respectively 1.9 μm, 1.4 μm and 4.6 μm. They are all greater than the maximum thickness non-uniformities of the glass substrates in FIG. 7. Thus, it is illustrated that the film-coating process may cause phenomenon of uneven thickness distribution of the glass substrate more intense.

By the above measurement results, the glass substrates used in the market do have non-uniform thickness, and the degrees of thickness non-uniformity of the glass substrates manufactured in the same production process are not entirely the same. Hence, non-uniformity of the brightness (Mura) of thin film transistor liquid crystal display (TFT-LCD) may have a particular relationship with the thickness non-uniformity of the glass substrates.

Furthermore, the present invention can be applied not only to the transparent glass substrates to wavelength of light, as mentioned above, but also to transparent plastic substrates used in flexible displays for thickness measurement. The common plastic materials are polyethylene terephthalate (PET), polyethylene naphthalate (PEN) and polycarbonate (PC), etc., whose thicknesses are within a range between 0.5 and 1 millimeter (mm) with changes within ±20%. The present invention not only measures transparent objects by visible light but also objects of silicon wafers or the metal films. When the object is silicon wafer, the laser source is an infrared laser.

Thereby, the present invention is an optical interferometric device for real-time wide-area thickness inspection. The inspection is non-contact and non-destructive by illuminating a high-coherence point-expanded spherical-wave light beam on an object in an oblique angle. The IFP thus imaged on the screen is related to the thickness distribution of the object. Since the present invention does not need optical lens groups and the special optical elements in the optical path of interference and the phase-shift process, the inspection device is low cost and can achieve the measurement requirement of the rapid online inspection. Because angles of incident light rays on the same cross section show a continuous increasing distribution from light source side to the other side, i.e. from left side to right side in the preferred embodiment, phase differences will show a continuous monotonic decreasing distribution. Based on this regularity, the phase unwrapping can be effectively performed without using the phase shift. Besides, the full-field thickness distribution of a large-area object can be measured. Hence, the present invention provides an optical interferometric technique without optical lens groups and the special optical elements in the optical path of interference, where a high-coherence point-expanded spherical-wave light beam illuminates to an object in an oblique angle for an instantaneous and wide-area full-field thickness measurement in a real-time online inspection.

To sum up, the present invention is an optical interferometric apparatus for real-time thickness inspection, where a low-cost optical interferometric technique is provided without using optical lens groups and the special optical elements in the optical path of interference to illuminate a high-coherence point-expanded spherical-wave light beam to an object in an oblique angle for an instantaneous and wide-area full-field thickness measurement in a real-time online inspection.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An optical interferometric apparatus for real-time thickness inspection, comprising:
    a light source comprising a laser source generating a laser beam;
    a spatial-filter point-expanded device; and
    a beam steering device located between the laser source and the spatial-filter point-expanded device so as to guide the laser beam to a determined position and direction and wherein the spatial-filter point-expanded device filters spatial noise in a light field and uniformly expands the laser beam to obtain a wide-area high-coherence point-expanded spherical-wavefront light beam;
    a screen located at a lateral side of said light source, wherein an interference fringe pattern (IFP) is imaged on said screen by illuminating said high-coherence point-expanded spherical-wavefront light beam on an object located between the spatial-filter point-expanded device and the screen in an oblique angle of an optical axis of the spatial-filter point-expanded device;
    an image acquisition unit located in front of said screen and capturing a single exposure of said IFP on said screen and converting the image into a single exposure digital image of said IFP for each object; and
    an image processing module connected with said image acquisition unit and comprising an analysis software unit having functions of thickness measurement, digital image access, and image analysis of the digital image of the IFP and a drawing software unit analyzing data from the analysis software unit and visualizing the analyzed digital image data to obtain a full-field thickness distribution of said object from the single exposure digital image of the IFP for each object.

2. The apparatus according to claim 1, wherein said object is a material penetrable by a wavelength of said light source and is selected from a group consisting of a glass substrate and a transparent plastic substrate made of a material selected from a group consisting of polyethylene terephthalate (PET), polyethylene naphthalate (PEN), and polycarbonate (PC).

3. The apparatus according to claim 1, wherein said object is a material penetrable by a non-visible wavelength of said light source and is selected from a group consisting of a silicon wafer and a metal film.

4. The apparatus according to claim 1, wherein said image processing module uses the analysis software unit to extract distribution of phase differences from said digital image of said IFP; and angles of incident light rays at positions of said object are calculated according to geometrical relationship of space to further calculate corresponding thickness; wherein said object is a material penetrable by a wavelength of said light source, a relationship of said object; said angle of said incident light ray at one of said positions of said object; a refractive index at said one of said positions; and said phase difference at said one of said positions is as follows:

$$t(x, y) = \frac{1}{2n\cos\left[\sin^{-1}\left(\frac{1}{n}\sin\theta_i(x, y)\right)\right]} \frac{\lambda}{2\pi} \varphi(x, y);$$

and
    wherein t(x,y) is said corresponding thickness of said object at said one of said positions; λ is said wavelength of said light source; n is said refractive index of said λ wavelength of said object; $\theta_i(x,y)$ is said angle of incident light ray at said one of said positions when said object is illuminated by said high-coherence point-expanded spherical-wavefront light beam of said light source in said oblique angle; and $\phi(x,y)$ is said phase difference at said one of said positions.

5. The apparatus according to claim 4, wherein said oblique angle of said high-coherence point-expanded spherical-wavefront light beam of said light source is expressed as a relationship as follows:

$$\theta_{iO} = \tan^{-1}\frac{D}{L};$$

wherein D and L are a horizontal distance and a vertical distance between said light source and a contour reference point $(x_c, y_c)$ on a front surface of said object, respectively; and wherein said angle of incident light ray at a point (x,y) on said front surface of said object is expressed as a relationship as follows:

$$\theta_i(x, y) = \tan^{-1}\left[\frac{\sqrt{(x - x_c - D)^2 + (y - y_c)^2}}{L}\right].$$

6. The apparatus according to claim 1, wherein said oblique angle of said high-coherence point-expanded spherical-wavefront light beam of said light source illuminates on said object is located within a range between 16°~18° and said range has a change in value within ±20%.

7. The apparatus according to claim 1, wherein said spatial-filter point-expanded device comprises an object lens with coordinated pinholes; wherein said beam steering device comprises three mirrors; and wherein each of said mirrors has degrees of freedom in two rotating directions.

* * * * *